(12) United States Patent
Mostafa

(10) Patent No.: US 7,496,164 B1
(45) Date of Patent: Feb. 24, 2009

(54) SYSTEMS AND METHODS FOR INTERFERENCE CANCELLATION IN A RADIO RECEIVER SYSTEM

(75) Inventor: Ayman A. Mostafa, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 811 days.

(21) Appl. No.: 10/837,933

(22) Filed: May 3, 2004

Related U.S. Application Data

(60) Provisional application No. 60/467,446, filed on May 2, 2003.

(51) Int. Cl.
*H03D 1/04* (2006.01)
(52) U.S. Cl. .................. 375/346; 375/254; 375/285
(58) Field of Classification Search ............ 375/346, 375/254, 285
See application file for complete search history.

(56) References Cited

U.S. PATENT DOCUMENTS

| | | | | |
|---|---|---|---|---|
| 5,937,015 | A | * | 8/1999 | Dent et al. ............... 375/341 |
| 6,137,843 | A | * | 10/2000 | Chennakeshu et al. ...... 375/340 |
| 6,304,618 | B1 | * | 10/2001 | Hafeez et al. ............. 375/341 |
| 6,678,520 | B1 | * | 1/2004 | Wang ..................... 455/428 |
| 6,807,240 | B2 | * | 10/2004 | Alamouti et al. .......... 375/341 |
| 2002/0141437 | A1 | * | 10/2002 | Meyer et al. .............. 370/442 |
| 2003/0185292 | A1 | | 10/2003 | Fernandez-Corbaton et al. |
| 2004/0109670 | A1 | | 6/2004 | Kim et al. |
| 2004/0192215 | A1 | | 9/2004 | Onggosanusi et al. |
| 2005/0036575 | A1 | | 2/2005 | Kuchi et al. |
| 2005/0042997 | A1 | | 2/2005 | Steele et al. |

| | | |
|---|---|---|
| 2007/0263744 A1 | 11/2007 | Mostafa |

OTHER PUBLICATIONS

Hyvärinen, "Independent Component Analysis: Algorithms and Applications", Neural Networks, 13(4-5):411-430, May-Jun. 2000.*
Olofsson, "Interference diversity gain in frequency hopping GSM" 1995 IEEE 45th Vehicular Technology Conference, vol. 1, Jul. 25-28, 1995 pp. 102-106 vol. 1.*
Craig, "A system performance evaluation of 2-branch interference rejection combining", 2002 IEEE 56th Vehicular Technology Conference, 2002. Proceedings. VTC 2002-Fall. vol. 3, Sep. 24-28, 2002 pp. 1887-1891 vol. 3.*
Bingham, "A Fast Fixed-Point Algorithm for Independent Component Analysis of Complex Valued Signals", Neural Networks Research Centre, Helsinki University of Technology, Jan. 19, 2000.*
Vainio, "Multistage adaptive filters for in-phase processing of line-frequency signals", Instrumentation and Measurement Technology Conference, 1997.IMTC/97, Proceedings, 'Sensing, Processing, Networking', IEEE, vol. 1, May 19-21, 1997 pp. 428-433 vol. 1.*

(Continued)

*Primary Examiner*—Juan A Torres
(74) *Attorney, Agent, or Firm*—Zagorin O'Brien Graham LLP

(57) ABSTRACT

A system and method for interference cancellation is provided to cancel/greatly reduce the interference of a wireless network. The interferers are separated from a desired signal using independent component analysis by hypothesizing the transmitting sequence. An optional whitening filter is used after the signal separation to improve the signal conditioning. The separated signal is processed by a second pass channel estimation to improve the signal channel estimation and is fed to a Maximum Likelihood Sequence Estimation (MLSE) algorithm, such as a Viterbi algorithm, for signal detection.

20 Claims, 9 Drawing Sheets

OTHER PUBLICATIONS

Buehrer, R. Michael, et al., "Intelligent Antennas for Wireless Communications—Uplink," Bell Labs Technical Journal, Jul.-Sep. 1999, pp. 73-103.

Haykin, S., "Adaptive Filter Theory," third edition, Prentice-Hall, Inc., 1996, pp. 262-271.

Lee, William C. Y., "Mobile Communications Design Fundamentals," second edition, chapter 6, 1993, title page and pp. 199-225.

Mostafa, Ayman, et al., "Single Antenna Interference Cancellation (SAIC) for GSM Networks," IEEE Vehicular Technology Conference, Oct. 2003, pp. 1089-1093.

Mostafa, Ayman, et al., "Single Antenna Interference Cancellation (SAIC) Method in GSM Network," IEEE Vehicular Technology Conference, Sep. 2004, 5 pages.

U.S. Appl. No. 11/088,368, filed Mar. 24, 2005, entitled "Interference Cancellation and Recieve Diversity for Single-Valued Modulation Receivers."

Proakis, John G., Digital Communications, second edition, chapter 7, McGraw-Hill, 1989, title page and pp. 702-799.

SAIC and Synchronized Networks for Increased GSM Capacity, prepared by 3G Americas' SAIC working group, Mark Austin, editor, Sep. 2003, pp. 1-26.

Trigui, Hafedh and Dirk T. M. Slock, "Cochannel Interference Cancellation Within the Current GSM Standard," Proceedings of the IEEE 1998 International Conference on Universal Personal Communications, Oct. 5-9, 1998, Florence, Italy, pp. 511-515.

U.S. Appl. No. 11/561,134, filed Nov. 17, 2006, entitled, "Systems and Methods for Interference Cancellation in a Multiple Antenna Radio Receiver System," naming inventor Ayman Mostafa.

Hyvärinen, Aapo and Oja, Erkki, "Independent Component Analysis: A Tutorial," Helsinki University of Technology, Laboratory of Computer and Information Science, Apr. 1999, pp. 1-30.

* cited by examiner

SYSTEMS AND METHODS FOR INTERFERENCE CANCELLATION IN A RADIO RECEIVER SYSTEM

CROSS-REFERENCE TO RELATED APPLICATIONS

This application claims priority to U.S. Provisional Patent Application No. 60/467,446 entitled "A Method for Interference Separation/Cancellation for Wireless Network", filed May 2, 2003, which is incorporated herein by reference in its entirety.

BACKGROUND OF THE INVENTION

1. Field of the Invention

This application relates to interference cancellation, specifically as such interference cancellation applies to wireless telecommunications.

2. Description of the Related Art

When observing a cocktail party, a few characteristics relating to the sound are readily apparent. One is that individual conversations can be heard by the participants of those individual conversations and by those in close proximity thereto. The second is that to a person not taking part in a conversation and also not within close proximity to any individual conversation, the collective noise of the many conversations can be heard, but no individual conversation can be discerned from the general noise. In the first instance, the conversations can be heard because the signal (i.e., voice) to interference ratio is strong within close proximity to the speaker. In the second instance, the signal to interference ratio is low, and therefore interference from multiple conversations masks the individual conversations. Both observations, however, highlight the role that interference can have on sound quality.

The same phenomenon is applicable to wireless communications. Interference degrades performance, and unless the signal to interference (noise) ratio is sufficiently high, no particular signal can be discerned. In simplistic terms, that means the voice on the other end of a cellular telephone call may not be heard by a receiver of the call if the interference is too strong. Accordingly, cellular and other wireless communications systems have been designed to insure that the signal received by the wireless device is sufficiently strong relative to the interference such that the voice (and data) can be heard and understood.

Mobile telecommunication service providers and vendors are constantly striving to improve the quality and performance of cellular telephone communications. One such area of focus is the reduction of the interference caused from either (1) adjacent frequency carriers of a cellular base station, known by those skilled in the art as "adjacent channel interference," or (2) adjacent cellular base stations operating at the same frequency carrier, known by those skilled in the art as "co-channel interference." The problem of interference is exacerbated when the cellular system is operating within a tight frequency spectrum, especially and including GSM (Global System for Mobile Communications) with a high traffic load. At the present time, there is nothing implemented in a mobile handset that will cancel or greatly reduce either the adjacent channel or co-channel interference. Accordingly, communications utilizing such handsets are not able to optimize the use of the available frequency spectrum.

As will be appreciated by those skilled in the art, similar to the so-called cocktail party problem, the interference observed by a cellular telephone receiver is a summation of individual interference from each of a variety of sources. Such sources of interference include, among other things, adjacent channels within a base station and co-channel and adjacent channels from surrounding base stations, and may include interference from other sources as well. Because nothing is known about the individual signals causing the interference, it is difficult to extract the original voice signal; hence the cocktail party problem arises.

There are known techniques for reducing or canceling the noise in certain circumstances. For example, in analyzing the summation of multiple interference signals, it is possible to determine whether one particular interference source is dominant over the others contributing to the summation. The term "dominant interference ratio" or DIR, is used to describe the ratio of interference caused by an individual interference source to the summation of interference from all the interference sources combined. In the case where there is a DIR much greater than one (1), there is typically a dominant interferer. In the case where the DIR is less than or approximately equal to one (1), then there is no dominant interferer.

Manufacturers and others in the telecommunications industry have been addressing the interference problem by designing interference cancellation features into their systems. One way to combat the interference is to use frequency hopping where the interference at a certain frequency will be distributed among multiple frequencies instead of being focused on one frequency. See, for example, Olofsson, "Interference Diversity Gain in Frequency Hopping GSM," 1995 IEEE, 45th Vehicular Technology Conference, Vol. 1, 25-28 Jul. 1995, pages 102-106. Such interference averaging schemes are marginally helpful but do not quite reduce or cancel the interference source to acceptable levels. Another example of interference mitigation is to use a technique known in the art as "Interference Rejection Combining" (IRC). See, for example, Craig et al., "A System Performance Evaluation of 2-Branch Interference Rejection Combining," 2002 IEEE 56th Vehicular Technology Conference, 2002. Proceedings. VTC 2002-Fall. Vol. 3, 24-28 Sep. 2002, pages 1887-1891. Each of the above-cited references is hereby incorporated by reference in its entirety. IRC is marginally effective where there is a dominant interference source, i.e., those systems where the DIR is much greater than one (1). For those situations where there is not a dominant interference source, the interference suppression techniques being developed by those skilled in the art are mostly ineffective and the benefits realized pale in comparison to the cost of implementation.

In various interference suppression techniques outside of the cellular telephone industry, there exist various methodologies relating generally to interference suppression. However, those prior art techniques are only applicable in a situation where there is a multiple antenna system. Using those known techniques, those skilled in the art will appreciate that if there is a series of N antennas forming a system, interference can be suppressed for all but one (N−1) of those antennas. This is because at least two actual signals must be observed for the known suppression algorithms to be applicable. In the context of a mobile handset in a cellular telephone system, however, there is a single antenna, not multiple antennas, which is experiencing the interference. Therefore, using conventional known techniques, there is no methodology to suppress multiple interferers experienced by the single antenna in a wireless device.

One option considered in the industry would be to add a second antenna in each handset and then apply cancellation techniques to one of those antennas. While this solution is associated with increases cost, weight and complexity, single antenna interference cancellation with moderate interference suppression is a preferred solution.

U.S. patent application of Meyer et al., Publication No. U.S. 2002/0141437 (the "Meyer Application") addresses a method for interference suppression for TDMA and/or FDMA transmissions, with an arbitrary number of receive antennas. The Meyer Application discloses a real value modulation technique wherein the real component of a received signal is separated from an imaginary component of the received signal. The measured received signal is phase shifted from the transmit signal due to channel oscillation and other factors. The received signal is then projected back onto the real axis. The methodology assumes signal and part of interference are orthogonal and, as such, the real and imaginary part of the signal can be exploited to cancel the interference. The inventor believes that the methodology described in the Meyer application is sensitive to the actual data comprising the signal, including some of the embedded data signals such as the training sequence. Also, the complexity of the calculations appears to be significantly higher than the complexity of the present invention. Because of this, the technique is unreasonable to implement in a large-scale wireless telecommunication system.

Another method of interference cancellation, involving at least 2 antenna systems, is combining algorithms, including a "switching combining algorithm" wherein one of the signals is ignored at any given point in time, and an "interference ratio combining algorithm" wherein each signal is weighted in accordance with its signal-to-interference ratio. Again, the problem with these types of combining algorithms is that they require the observations to be independent in order to provide reasonable gain. As will be appreciated by those skilled in the art, the ability to receive highly independent receive signals within the small footprint of a handset is a very challenging task.

The inventor has developed a solution to the single and multiple antenna problems with the present invention. While the present invention may utilize any number of existing known algorithms, including the combining algorithms or the real-value modulation set forth above, the methodology of the present invention preferably uses independent component analysis, or ICA, and applies it to the experience of the single antenna wireless device. ICA is known by those skilled in the art as a statistical model where the observed data is expressed as a linear combination of underlying latent variables. In ICA, the latent variables are assumed non-Gaussian and mutually independent, which assumptions apply to a wireless device antenna as well. The task is to find out both the latent variables and the mixing process. The ICA model used is $$x = As$$

where $x = (x_1, x_2, \ldots x_n)$ is the vector of observed random variables and $s = (s_1, s_2, \ldots s_n)$ is the vector of statistically independent latent variables called the independent components, and A is an unknown constant mixing matrix. ICA is very closely related to blind source separation (BSS), where a "source" means the original signal, such as the original voice transmission (or the speaker at a cocktail party). Independent component analysis is described in more detail in the literature, for example in Hyvärinen and Oja, "Independent Component Analysis: A Tutorial," Helsinki University of Technology, Laboratory of Computer and Information Science, April 1999, and Bingham and Hyvärinen, "A Fast Fixed-Point Algorithm for Independent Component Analysis of Complex Valued Signals," Neural Networks Research Centre, Helsinki University of Technology, 19 Jan., 2000, each of which is incorporated by reference.

In conjunction with the preferred embodiment of the present invention, the inventor has created new and non-obvious whitening filter which, when implemented in accordance with the parameters set forth herein, further improves performance of the interference cancellation process.

Accordingly, the present invention solves a major problem of interference in the wireless communications industry. The methodology that has been developed may be implemented in a wireless device to suppress interference signals and improve the signal quality of the received signal. The invention permits a substantial reuse of frequencies in wireless communications, thereby increasing the capacity of the network significantly. The methodology of the present invention is applicable to all wireless technologies, including TDMA, CDMA, GSM, EDGE, WCDMA, 802.11 and 802.16, using any of a variety of modulation techniques, including GMSK, QPSK, 8PSK, and OFDM.

The present invention may be embodied in a receiver used in such wireless communications. The receiver preferably implements the present invention in conjunction with a separation algorithm optimized for the particular technology in order to increase the quality of the received signal. Such a receiver would then be useful in a system in which the co-channel interference and adjacent channel interference may be increased in order to obtain significant capacity increases in the network.

The present invention also may be embodied in the uplink stage of n multi-receivers in a Base Station Transceiver Subsystem (BTS). As such, not only could the interference cancellation algorithm be utilized in a conventional manner for n−1 of those multiple receivers, but rather the present invention enables cancellation of interference for all n of such individual receive antennas in the BTS.

While the present invention has been described in terms of cellular mobile radio telecommunications systems, the invention is applicable across a broad range of applications and devices wherein single or multiple antennas receive signals that are susceptible to various types of interference.

As set forth in the detailed description of the preferred embodiment, including the graphical results set forth therein, the present invention has achieved results far exceeding those which would be reasonably expected by those skilled in the art attempting to solve the interference problem in wireless communications.

BRIEF DESCRIPTION OF THE DRAWINGS

Reference will now be made in detail to the preferred embodiments of the present invention, examples of which are illustrated in the accompanying drawings, and wherein like reference numerals identify like or similar structures or processes and wherein.

DETAILED DESCRIPTION OF THE PREFERRED EMBODIMENT

The exemplary embodiments described herein are preferably applied to interference cancellation for a wireless downlink channel, i.e., a channel conveying information from a transceiver or base station of a wireless cellular system to a receiver, and to apparatus and methods that may be implemented in a wireless communications terminal, for example, a cellular radiotelephone, wireless capable personal digital assistant (PDA) or similar communications device. The present invention is also applicable in an alternative embodiment wherein multiple receive antennas in a wireless cellular system, e.g., a base station receiver, desire interference cancellation in order to enhance signal quality and capacity. It will be further appreciated, however, that the present invention may be used in other environments, e.g., in other types of wireless transmitter applications or in wireless receiver applications in which traditional interference cancellation techniques are not available or ineffective. The system and method provides significant gain over all previous methods with no limitation to the frequency type or specific interference profile such as the ratio of the dominant interferer to the other interferers. It is possible to separate the interferers without prior knowledge of the specific parameters of the interferers and with much less complexity than conventional joint demodulation detection methods. The algorithm employed is considered a blind estimation approach which makes it attractive for wireless devices that have limited power resources.

Figure 1:
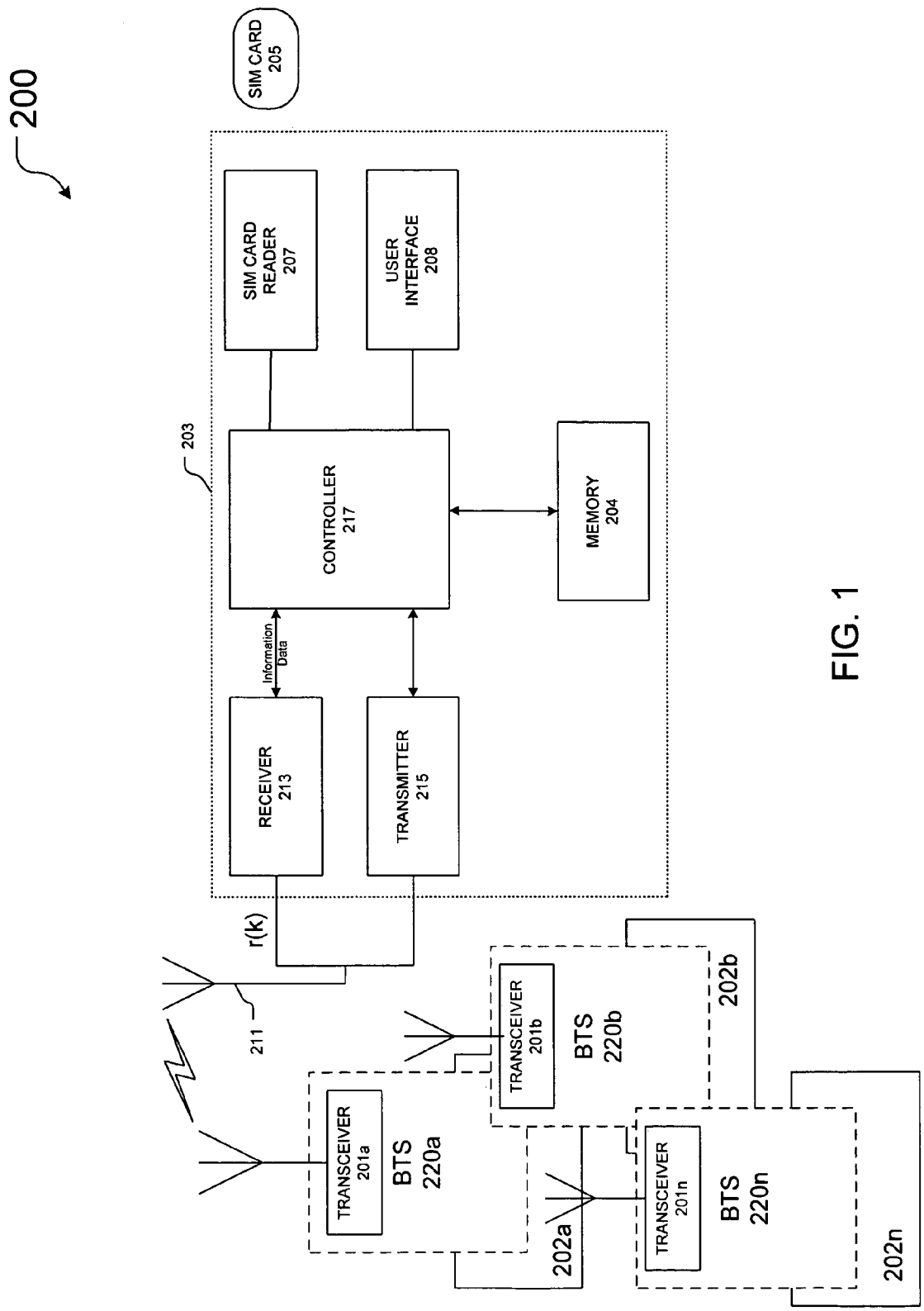
FIG. 1 is a block diagram of a portion of a wireless communication system showing the main functional components of a handset constructed in accordance with the teachings of the present invention.

This application utilizes various acronyms throughout the specification and drawings. For convenience, unless otherwise set forth in the text, those acronyms are defined as follows:

AFC—Automatic Frequency Correction
AWGN—Additive White Gaussian Noise
BTS—Base Transceiver Subsystem (or Base Station)
BER—Bit Error Rate
CDMA—Code Division Multiple Access
C/I—Carrier to Interferer Ration Ratio
DFSE—Decision Feedback Sequence Estimator
DIR—Dominant Interferer Ratio
DSP—Digital Signal Processing
EDGE—Enhanced Data rates for Global Evolution
FDMA—Frequency Division Multiple Access
GMSK—Gaussian Minimum Shift Keying
8PSK-8 (constellation) Phase Shift Keying
GPRS—Generalized Packet Radio System
GSM—Global System for Mobile Communications
MLSE—Maximum Likelihood Sequence Estimation
OFDM—Orthogonal Frequency Division Multiplexing
QPSK—Quaternary Phase Shift Keying
RSSE—Reduced State Sequence Estimation
SAIC—Single Antenna Interference Cancellation
TDMA—Time Division Multiple Access
TSC—Training Sequence Code
WCDMA—Wide-band CDMA With reference to FIG. 1, there is shown a mobile telecommunications system 200 with a mobile device 203 and multiple cellular antenna transceivers 201a, 201b . . . 201n (generically referred to hereinafter as 201). The present invention may be implemented in any type of mobile telecommunications system 200, including a GSM/GPRS telecommunications system in which there is a mobile receiver 213 subject to interference. Implicit in the adaptability to various types of networks is the adaptability to the various encoding schemes associated with those networks, i.e., GMSK for GSM. The methods set forth as part of the invention herein are applicable for other coding schemes as well, including QPSK (TDMA), 8PSK (EDGE and WCDMA), OFDM (e.g. 802.11; 802.16). The whitening filter and filtering methodology of the present invention is valid for single-valued modulation such as GSM and BPSK and other single-valued modulation techniques. However, as will be understood by those in the art, coding schemes such as QPSK and 8-PSK use vector value modulation and hence may not achieve as significant a benefit from the inherent diversity nature of the whitening filter and filtering methodology presented herein.

In the description of a preferred embodiment in which the single antenna interference cancellation occurs in the mobile device 203, the cellular antenna transceivers 201 require no modification from that known in the art. Each of the cellular antenna transceivers 201 are typically operated in sectors 202a, 202b, 202n (generally 202), and may, for example, comprise three sectors per cellular antenna transceiver 201. Each of the sectors transmits to a mobile device 203 in accordance with its own frequency mapping and its own training sequence code (TSC).

Figure 2:
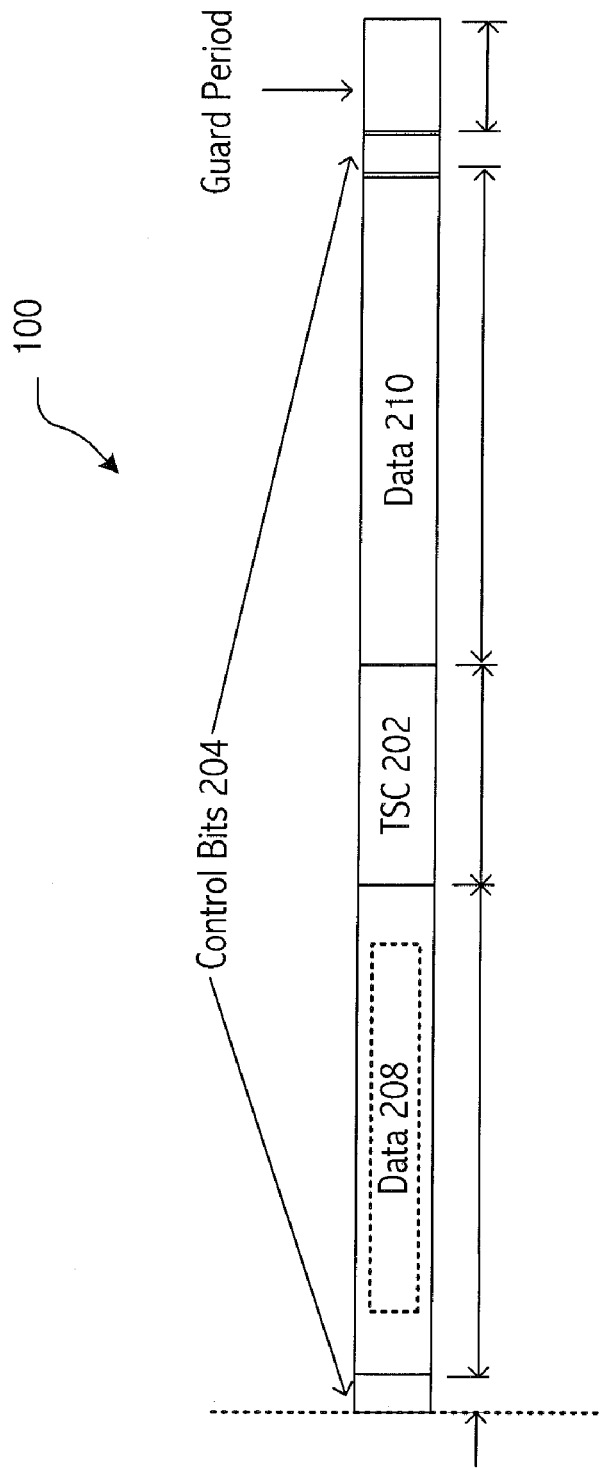
FIG. 2 is an example of a typical GSM data stream in which the Training Code Sequence is shown.

As illustrated in FIG. 2, the TSC 102 is typically an 26 bit code embedded in a transmission burst 100 from cellular antenna transceivers 201 and used as an identifier for all mobile devices 203 in a particular sector 202. FIG. 2 illustrates a typical burst configuration. A particular TSC 102 is typically assigned to a sector or a cell. Since there are a total of 8 TSC codes, cells within the network reuse TSC codes. In a typical GSM configuration, each transceiver 201 transmits a burst every 4.7 milliseconds, or over 200 bursts per second. The TSC 102 may be embedded in the middle of the transmission burst 100 along with control bits 104 and data bits 108, 110 in accordance with system design and/or industry standards. In a hand-off to the next antenna, the TSC 102 parameter for the new sector 202 is conveyed to the mobile device 203 along with the assigned frequency and time slot. As such, the TSC 102 is a known parameter in any mobile telecommunications system 200 and all types of mobile devices 203 are capable of identification thereof.

The present invention utilizes the TSC 102 in a novel and non-obvious manner in performing the antenna interference cancellation algorithm. That algorithm as applied to a single antenna system will be described below, followed by a detailed description of a preferred embodiment of that algorithm within a mobile telecommunications system 200 and mobile device 203.

The received desired signal output at a receive filter (RX filter 222 of FIG. 3) within the mobile device 203 for the i antenna branch can be written as:

$$r_{d\,i}(k) = \sum_{n=0}^{L_{id}-1} h_{id}(n)d(k-n) \qquad (1)$$

-continued $$r_{int\ ij}(k) = \sum_{n=0}^{L_{ij}-1} h_{ij}(n) I_j(k-n) \quad j = 1, \ldots, N$$

where $r_{di}(k)$ is the desired signal received for the 'i' branch $r_{int\ ij}(k)$ is the received 'j' interferer signal received at the 'i' branch.

d(k) is the desired transmitted data symbols $I_j(k)$ is the interferer transmitted data symbols from 'j' interferer at the 'i' branch.

$h_{ij}(n)$ is the effective channel impulse of the 'j' interferer for the 'i' branch.

$h_{id}(n)$ is the effective channel impulse of the desired signal for the 'i' branch.

$L_{id}$ is the length of the effective channel impulse response of the desired signal L is the length of the effective channel impulse response of the 'j' interferer The effective channel impulse response is defined as the convoluted, transmitted received filters and the media response and can be represented by the following equation:

$$h_{eff}(n) = tx(n) * C(n) * rx(n) \quad (2)$$

wherein
 tx(n) is the filter response of the linearized GMSK filter as defined in the 3GPP, GERAN Standards (which are hereby incorporated by reference);
 rx(n) is the receiver filter; and
 C(n) is the media response For generality, the inventor assumes that there are N interferers and M receiver branches. Moreover, for simplicity, the length of the effective channel impulse response of the desired signal and the interferer signal is assumed to be the same for the different receiver branches.

Description of the Separation Algorithm:

A general algorithm for separating multiple received signal (desired and interferers) based on the composite the received signals will be described. Assume M received signal through M branch antennas based on the desired signal and N interferers. We can express the received signal as follow:

$$r_1(k) = h_{1d} \otimes d(k) + h_{11} \otimes I_1(k) + h_{12} \otimes I_2(k) + \ldots h_{1N} \otimes I_N(k) + w_1(k) \quad (3)$$
$$r_2(k) = h_{2d} \otimes d(k) + h_{21} \otimes I_1(k) + h_{22} \otimes I_2(k) + \ldots h_{2N} \otimes I_N(k) + w_2(k)$$
$$\vdots$$
$$r_M(k) = h_{Md} \otimes d(k) + h_{M1} \otimes I_1(k) + h_{M2} \otimes I_2(k) + \ldots h_{MN} \otimes I_N(k) + w_M(k)$$

Where
 $r_i(k)$ is the received signal for branch 'i'
 $w_i(k)$ is the AWGN signal received in the branch 'i'; and
 $\otimes$ indicates convolution operator Note $r_1(k) \ldots r_M(k)$ may have some degree of correlation and that it is not necessary for such receive signals to be totally de-correlated.

For two diversity branches, equation (3) can be written as $$r_1(k) = r_{d\ 1}(k) + r_{int\ 1}(k) r_{int\ j}(k)$$
$$r_2(k) = r_{d\ 2}(k) + r_{int\ 2}(k) \quad (4)$$

wherein:

$$r_{d\ i}(k) = \sum_{n=0}^{L_d-1} h_i(n) d(k-n) \quad (5)$$

$$r_{int\ i}(k) = \sum_{j=1}^{N} \sum_{n=0}^{L_j-1} h_{ij}(n) I_j(k-n) + w_i$$

and wherein $r_{di}(k)$ is the desired signal received at the "i" branch, $r_{int\ i}(k)$ is the composite interference and noise signal received at the "i" branch, and n is the number of interferers.

In a preferred embodiment, the separation algorithm is carried over the training sequence. That is, in a single antenna system, the TSC 102 is used to create a hypothesized received signal and thereafter that hypothesized receive signal is used as a second received signal otherwise not available in a single antenna system. However, generally, the separation algorithm is preferably applied to all received signals. Specifically, the hypothesized received signal is constructed after decoding the soft bits from an equalizer. The decoded data bits should be very close, if not identical, to the transmitted data d(k). The decoded data is interleaved and modulated, to produce the signal d^(k), as if it was to be transmitted. While it is preferred to use the received symbols in the TSC 102 location of the transmission burst 100, for multiple sensors applications (that is, multiple receive branches), the separation algorithm may be carried over any portion of the received burst. For example, certain portions of a transmission burst 100 may be pre-defined and used in lieu of or in addition to the TSC 102.

A preferred separation algorithm to be used is based on the central limit theory. As will be appreciated by those skilled in the art, unless the independent components comprising interfering signals are Gaussian, the sum of those independent components tends to be more Gaussian than each of the individual components. For the purposes of this illustration, it is assumed that distribution of the original (or separated) signals is non-Gaussian and mutually independent, which is typically true in a GSM environment with the exception of the simulcast. Moreover, there are many iterative algorithms that may be used, with the rate of convergence and complexity being factors in an implementation decision. Note that the duration of a GSM transmission burst 100 is about 0.57 msec and therefore it may be safely assumed that the channel does not change over the course of the burst. There are two other assumptions in the separation algorithm, namely, that at most, one of the independent components, $d_j$, may be Gaussian and the unknown mixing matrix H must be of full rank and assumed to be constant.

In a system wherein $r=(r_1, r_2 \ldots r_M)$ is the vector of the observed random variables and $d=(d_1, d_2 \ldots, d_M)$ is the vector of statistically independent signals, r and d are combined. The covariance matrix of the observed random variables is given by:

$$E(rr^H) = \begin{pmatrix} C_{11} & \cdots & C_{1M} \\ \vdots & \ddots & \vdots \\ C_{1M} & & C_{MM} \end{pmatrix} \quad (6)$$

Where $r^H$ stands for the Hermitian, or conjugate transpose, of r. The covariance matrix is used to whiten the observed random variables to produce a new set of normalized random variables $\bar{r}=(\bar{r}_1, \bar{r}_2 \ldots \bar{r}_M)$ with zero mean and unit variance. Principle component analysis may be also used to whiten the observed random variables. Therefore, $C_{ij}=E(\bar{r}_i\bar{r}_j^H)=I$ is the covariance of random variables $\bar{r}_i$ and $\bar{r}_j$. It is desired to find a separation matrix S such that:

$$r_{clean}=S^H\bar{r} \quad (7)$$

As will be appreciated by those skilled in the art, the kurtosis, or fourth order statistics, is a measure of non-Gaussianity of a random variable. There are $2^4$ ways to define the kurtosis. The algorithm is used for separating the linearly mixed signals. Among the kurtosis functions commonly used, the following choices are preferred:

$$kurt(d)=E(|d|^4)-E(dd^*)E(dd^*)-E(dd)E(d\ d^*)-E(d\ d^*)E(d^*d)$$

$$kurt(d)=E(d^4)-2 \quad (8)$$

Note that if d is Gaussian, the Kurt vanishes—which is intuitive. The kurtosis is used in a Fast Fixed Point algorithm to calculate the updated value at each iteration. See, e.g., Hyvärinen and Oja, "Independent Component Analysis: A Tutorial," Helsinki University of Technology, Laboratory of Computer and Information Science, April 1999. Let $s_p(0)$ be the starting initial vector. Using the Fast Fixed point algorithm and using the first kurtosis definition in (6), the updated value is given by:

$$s_p(m+1)=s_p(m)+2*E\{\bar{r}(s_p^H(m)\bar{r})*-2s_p^H(m))|(s_p^H(m)\bar{r})|^2 \quad (9)$$

The new value is normalized $$s_p(m+1) = \frac{s_p(m+1)}{\|s_p(m+1)\|} \quad (10)$$

A convergence is reached when the condition $|s_p^H(m+1)s_p(m)|\approx 1$ is met, otherwise iteration continues. To avoid convergence to the previously found $s_p$, a deflation method based on Gram-Schmidt is applied where the estimated vector $s_p(m+1)$ at each iteration is subtracted from the previously 'p' found vectors. To estimate the N independent components, the algorithm needs to be executed N times. The algorithm can be prevented from converging into the previously found component by selecting a new starting vector that is orthogonal to the previously found ones.

The other signals are separated using a deflation method. The deflation tends to separate the independent component in the order of decreasing non-Gaussianity, which is often equal to decreasing the importance of the independent signals.

$$s_p(m+1) = s_p(m+1) - \sum_{j=1}^{P} s_j s_j^H s_p(m+1) \quad (11)$$

Description of the Temporal Whitening filter:

The key equations of a whitening filter developed as part of the present invention will now be described.

Equation (1) may be re-written as $$r_z(k) = \sum_{n=0}^{L-1} h_d(n)d(k-n) + u(n) \quad (12)$$

where u(n) is the contribution of the interference including the thermal noise and is mostly color noise, and $r_z(k)$ is the input signal to a whitening filter The color noise, u(n), as a random variable can be predicted using a one step predictor as $$\hat{u}(n|n-1) = \sum_{l=1}^{M} w_l u(n-l) \quad (13)$$

wherein M is the order of the predictor and wl is the filter coefficient of the forward predictor. Therefore, the forward prediction error is given by $$e(n)=u(n)-\hat{u}(n|n-1) \quad (14)$$

The detail of the known filter equation is given in *Adaptive Filter Theory*, Prentice Hall, Inc., by Simon Haykin, which is hereby incorporated by reference. After a detailed and lengthy manipulation, it can be shown that $$r_z(k) = \sum_{j=0}^{M+L-1} h_{fil}(j)d(k-j) + \sum_{l=1}^{M} w_l r_z(k-l) + e(k) \quad (15)$$

where $h_{fil}$ is the filtered extended channel estimate for the desired channel and e(k) is a white Gaussian noise random variable. Moreover, $h_{fil}$ can be given by $$h_{fil}=h_d*f \quad (16)$$

where $$f(l) = \begin{cases} 1 & l=0 \\ -w_l & l>0 \end{cases}$$

At this point, the goal is to find joint estimate of the channel condition of the desired signal and the parameters $w_l$, that approximate the color noise.

Ignoring the noise term, Equation 15 can be put in the following matrix form $$\begin{bmatrix} r_z(k) \\ r_z(k+1) \\ \vdots \end{bmatrix} = \begin{bmatrix} d(k) & d(k-1) & d(k-(M+L-1)) & r_z(k-1) & r_z(k-2) & \ldots & r_z(k-L) \\ d(k+1) & \ldots & \ldots & \ldots & \ldots & \ldots & r_z(k-L+1) \\ \vdots & \ldots & & & & & \end{bmatrix} \begin{bmatrix} h_{fil}(0) \\ h_{fil}(1) \\ \ldots \\ w_l(1) \\ \ldots \\ w_l(M) \end{bmatrix} \quad (17)$$

$$r(k) = d(k-1)h \quad (18)$$

where $$d(k-1) = [d(k) \; d(k-1) \ldots \quad (19)$$
$$d(k-(M+L-1)) \; r_z(k-1) \; r_z(k-2) \ldots r_z(k-L)]]$$

and $$h = \begin{bmatrix} h_{fil}(0) \\ h_{fil}(1) \\ \ldots \\ w_l(1) \\ \ldots \\ w_l(M) \end{bmatrix}$$

using the Minimum Mean Square Estimate (MMSE) for equation 18, we obtain $$P = R \, h \quad (20)$$

$$h = R^{-1}P \quad (21)$$

Where $$R = E\{d(k-1)d(k-1)^H\}$$

and $$P = E\{d(k-1)r(k)^H\} \text{ and}$$

$$h = \begin{bmatrix} h_{fil}(0) \\ h_{fil}(1) \\ h_{fil}(M+L=1) \\ \ldots \\ w_l(1) \\ \ldots \\ w_l(M) \end{bmatrix} \quad (22)$$

Where E{ } indicates the expectation operator and "H" indicates the Hermitian operator. The covariance matrix of the received signal is given by $$\sigma^2 = E\{r_z(k)r_z(k)^H\} \quad (23)$$

and the minimum mean square estimate is given by $$\sigma_r^2 = \sigma^2 - P^H R^{-1} P \quad (24)$$

The inventor prefers to take advantage of the inherent diversity of the GMSK modulation. To do so, it is preferred to separate the real and imaginary parts of the received signal as if they were independent branches. Therefore, equation 15 can be re-written as:

$$x(k) = \sum_{j=0}^{M+L-1} h_{xfil}(j)d(k-j) + \sum_{l=1}^{M} w_{lxx}x(k-l) + \sum_{l=1}^{M} w_{lyx}y(k-l) + e_x(k) \quad (25)$$

and $$y(k) = \sum_{j=0}^{M+L-1} h_{yfil}(j)d(k-j) + \sum_{l=1}^{M} w_{lyy}y(k-l) + \sum_{l=1}^{M} w_{lxy}x(k-l) + e_y(k)$$

where $$r_z(k) = x(k) + jy(k)$$

$$h_{fil}(j) = h_{xfil}(j) + jh_{yfil}(j)$$

Note that d(k−1), r(k) and h are now modified to be described in Equation 26 below.

$$d(k-1) = \begin{bmatrix} d(k) & d(k-1) & \ldots & d(k-(M+L-1)) & x(k-1) \\ x(k-2) & \ldots & x(k-M) & y(k-1) & y(k-2) & \ldots & y(k-M) \end{bmatrix} \quad (26)$$

$$r(k) = \begin{pmatrix} x(k) \\ y(k) \end{pmatrix}$$

-continued $$h = \begin{bmatrix} h_{xfil}(0) & h_{yfil}(0) \\ h_{xfil}(1) & h_{yfil}(1) \\ \ldots & \ldots \\ h_{xfil}(M+L-1) & h_{yfil}(M+L-1) \\ w_{xxl}(1) & w_{lyy}(M) \\ \ldots & \ldots \\ w_{lxx}(M) & w_{lyy}(M) \\ w_{yxl}(1) & w_{lxy}(M) \\ \ldots & \ldots \\ w_{lyx}(M) & w_{lxy}(M) \end{bmatrix}$$

A joint Minimum Mean Square Estimate (MMSE) is carried out for equation (18) to yield the coefficients in 'h'.

The inventor prefers to take advantage of the inherent diversity of the GMSK modulation. To do so, it is preferred to separate the real and imaginary parts of the received signal as if they are impendent branches. Therefore, equation 15 can re-written as:

$$x(k) = \sum_{j=0}^{M+K-1} h_{xfil}(j)d(k-j) + \sum_{l=1}^{M} w_{lxx}x(k-l) + \sum_{l=1}^{M} w_{lyx}y(k-l) + e_x(k) \quad (25)$$

and $$y(k) = \sum_{j=0}^{M+K-1} h_{yfil}(j)d(k-j) + \sum_{l=1}^{M} w_{lyy}y(k-l) + \sum_{l=1}^{M} w_{lxy}x(k-l) + e_y(k)$$

where $$r_z(k) = x(k) + jy(k)$$

$$h_{fil}(j) = h_{xxfil}(j) + jh_{yfil}(j)$$

Note that d(k−1), r(k) and h are now modified to be described in Equation 26 below.

$$d(k-1) = \begin{bmatrix} d(k) \; d(k-1) \; \ldots \; d(k-(M+L-1)) \; x(k-1) \\ x(k-2) \; \ldots \; x(k-M) \; y(k-1) \; y(k-2) \; \ldots \; y(k-M)] \end{bmatrix} \quad (26)$$

$$r(k) = \begin{pmatrix} x(k) \\ y(k) \end{pmatrix}$$

$$h = \begin{bmatrix} h_{xfil}(0) & \vdots & h_{yfil}(0) \\ h_{xfil}(1) & \vdots & h_{yfil}(1) \\ \ldots & \vdots & \ldots \\ h_{xfill}(M+L-1) & \vdots & h_{yfil}(M+L-1) \\ w_{xxl} & \vdots & w_{lyy}(M) \\ \ldots & \vdots & \ldots \\ w_{lxx}(M) & \vdots & w_{lxy}(M) \\ w_{yxl}(1) & \vdots & w_{lxy}(M) \\ \ldots & \vdots & \ldots \\ w_{lyx}(M) & \vdots & w_{lxy}(M) \end{bmatrix}$$

A joint Minimum Mean Square Estimate (MMSE) is carried out for equation (18) to yield the coefficients in 'h'.

Note that the above algorithm can run at the sample at the symbol level. In the preferred embodiment, the algorithm runs at an oversampling factor of 2 where a tradeoff between the complexity and performance was maintained. There preferably should be a decimating block after the filter block if over-sampling is used.

Detecting Interference Signals

In an alternative embodiment, after separating the desired signal the hypothesized signal $r_{d\,2}(k)$ is constructed over the training sequence or any known signaling part of the burst for some or all training sequence codes available for all interfering signals to be separated. The new hypothesized signal $r_d\,2(k)$ is fed to the separation algorithm along with the composite received signal to separate that particular interferer. The process repeats until all interferers of interest are separated.

All separated interferers are fed to a revised (or weighted) channel estimate function separately where a revised value of the channel estimate is obtained. The new revised (or weighted) channel estimation for the desired signal and each separated interferer is fed to the equalizer, by way of a pre-filter, separately for signal detection. A revised Automatic Frequency Correction (AFC) loop using the detected bits of the equalizer is used to maintain and to track offset of the desired signal and each interferer signal.

Increasing the Network Capacity:

In an alternative embodiment the interferers may be used to increase the network capacity. The capacity may be increased by using the same frequency and time slot (TS) resources but different training codes or known signaling codes. In this novel approach to Frequency Division Multiple Access (FDMA) technology, not only is the interference being canceled, but rather the interferers are used as "desired" signals, especially for the Adaptive Multi-Rate Half Rate (AMR HR) or OL (overlay) arrangement.

The main desired signal and all other "auxiliary" signals (referred to in the previous discussion as interferers) are transmitted by the same BTS or other BTS within the same sector or area of coverage. Conceptually, this is similar to having multiple users using the same frequency resources simultaneously in the same coverage area, but with different coding schemes. The above algorithm separates the individual signals. This could be done by hypothesizing the received signal $r_{d2}$ through a rough channel estimate for every auxiliary signal. After separating the signal, a revised channel estimate of the auxiliary signal is performed as previously discussed, followed by the desired signal case and a sequential detection through MLSE. This may be done for every auxiliary signal.

This implementation leads to a network capacity increase of multiple folds, clearly unexpected results in a mature industry.

Gain Saturation of the Separation Function:

The separation algorithm converges to the desired signal and separates the interferers. The separation process works well for low C/I ratios because composite signals comprise a mixture of carriers and more closely resemble a Gaussian signal than does a single carrier. For high C/I ratios, that is not the case and convergence of the separation function may intermittently slip. Therefore, it is desirable to build a control function that examines the C/I ratios and then bypasses the separation algorithm for high C/I ratios. With a high C/I ratio with a dominant desired signal, the C/I estimation is rather straightforward and a simple finite state machine may be used to choose the signal to be passed to the equalizer.

Figure 4:
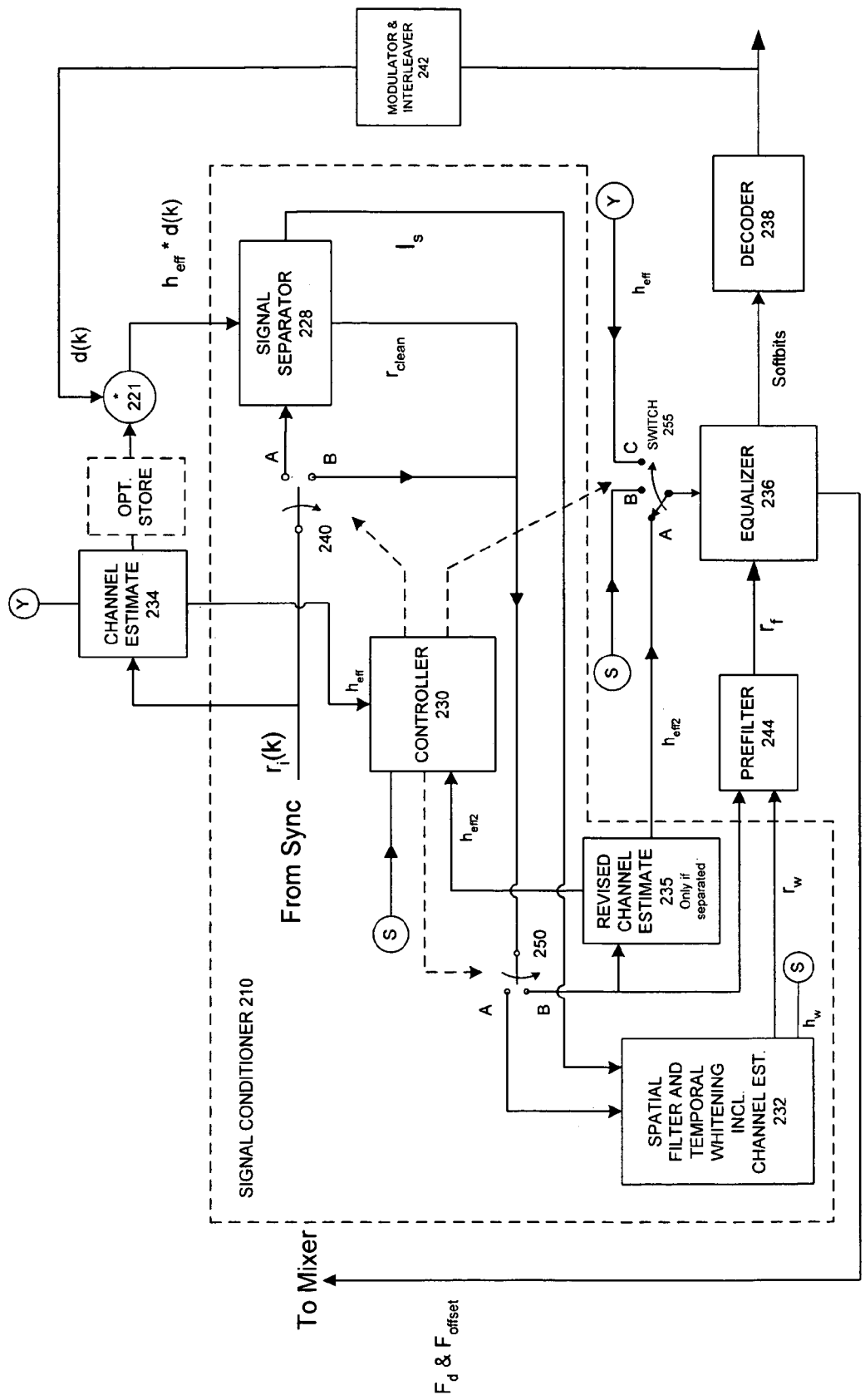
FIG. 4 is a block diagram of the signal conditioner functional component of the receiver illustrated in FIG. 3.

Bypassing the Separation Function:

The controller function box 230, shown in FIG. 4, compares the initial and revised (or weighted) C/I estimation and performs the separation function when both values are reasonably close and exceed a predetermined threshold $(C/I)_{thresh}$. In an alternative embodiment, if the initial channel estimation exceeds a predetermined $(C/I)_{thresh}$, the control switch may bypass the separation and filtering function altogether. This may be desired if minimum processing is required to conserve device battery resources.

The Separated Signal:

The desired separated signal is given by:

$$r_{clean} = Sr_1 \quad (27)$$

The signal is then fed to an MLSE-based equalizer 236 for signal detection which can, for example, be implemented using a Viterbi algorithm.

Application to Single Antenna Devices:

For single antenna devices, it is possible to hypothesize the reception of the desired signal to the separation function in the receiver. This assumption is valid for all known used wireless modulation techniques and is not specific to a modulation type. For example, the current invention may be used for 4-PSK (and its derivatives QPSK), (QPSK, pi/4-QPSK . . . etc), 8-PSK, QAM-n (n=4, 16, 64) and it is not limited to real-valued modulation. Note that the algorithm used here is not limited to inherent diversity gain. However, the Inventor's algorithm may exploit such diversity gain for such modulations. In that case, a spatio and temporal whitening may be used to optimize the performance.

FIG. 1 illustrates an exemplary GSM wireless system 200 according to this invention. The wireless system 200 comprises a BTS 220 having a transceiver 201 in communication with a mobile device 203 using antenna 211. Some of the components of the mobile device 203 are either generally known in the art or based on those generally known in the art, although functionally some of those components have been modified or enhanced as described herein with respect to the present invention. The mobile device 203 includes a controller 217, such as a microprocessor, microcontroller or similar data processing device that executes program instructions stored in a memory 204.

The memory 204 may be implemented using any appropriate combination of alterable, volatile or non-volatile memory or non-alterable, or fixed memory. The alterable memory, whether volatile or non-volatile, may be implemented using any one or more of static or dynamic RAM, a floppy disk and disk drive, a writable or re-writable optical disk and disk drive, a hard drive, flash memory or other alterable memory components known in the art. Similarly, the non-alterable or fixed memory may be implemented using any one or more of ROM, PROM, EPROM, EEPROM, an optical ROM disk, such as a CD-ROM or DVD-ROM disk, and disk drive or other non-alterable memory known in the art.

The controller 217 may be implemented as a single special purpose integrated circuit (e.g., ASIC) having a main or central processor unit for overall, system-level control, and separate sections dedicated to performing various specific computations, functions and other processes under the control of the central processor unit. The controller 217 can also be implemented as a single microprocessor circuit, DSP, or a plurality of separate dedicated or programmable integrated or other electronic circuits or devices, e.g., hardwired electronic or logic circuits such as discrete element circuits or programmable logic devices. The controller 217 also preferably includes other circuitry or components, such as memory devices, relays, mechanical linkages, communications devices, drivers and other ancillary functionality to affect desired control and/or input/output functions.

The controller 217 is operatively coupled with user interface 208. The user interface 208 may include items known in the art, such as a display, keypad, speaker, microphone, and other user interface I/O components. The controller 217 also controls the functions and operation of the SIM card reader 207, which typically is in communication with the SIM card 205 during operation of the mobile device 203. As is known in the art, the SIM card 205 typically stores information relating to the user, such as subscribed features, attributes, identification, account and other information that customizes a mobile device 203 for a typical user. The controller 217 also controls and/or monitors the operations of the transmitter 215 that transmits radio frequency (RF) signals to the transceiver 201 of a base station via the antenna 211 coupled to the mobile device 203. The controller 217 is also operatively connected to receiver 213, the functionality of which will be discussed in greater detail below.

Figure 3:
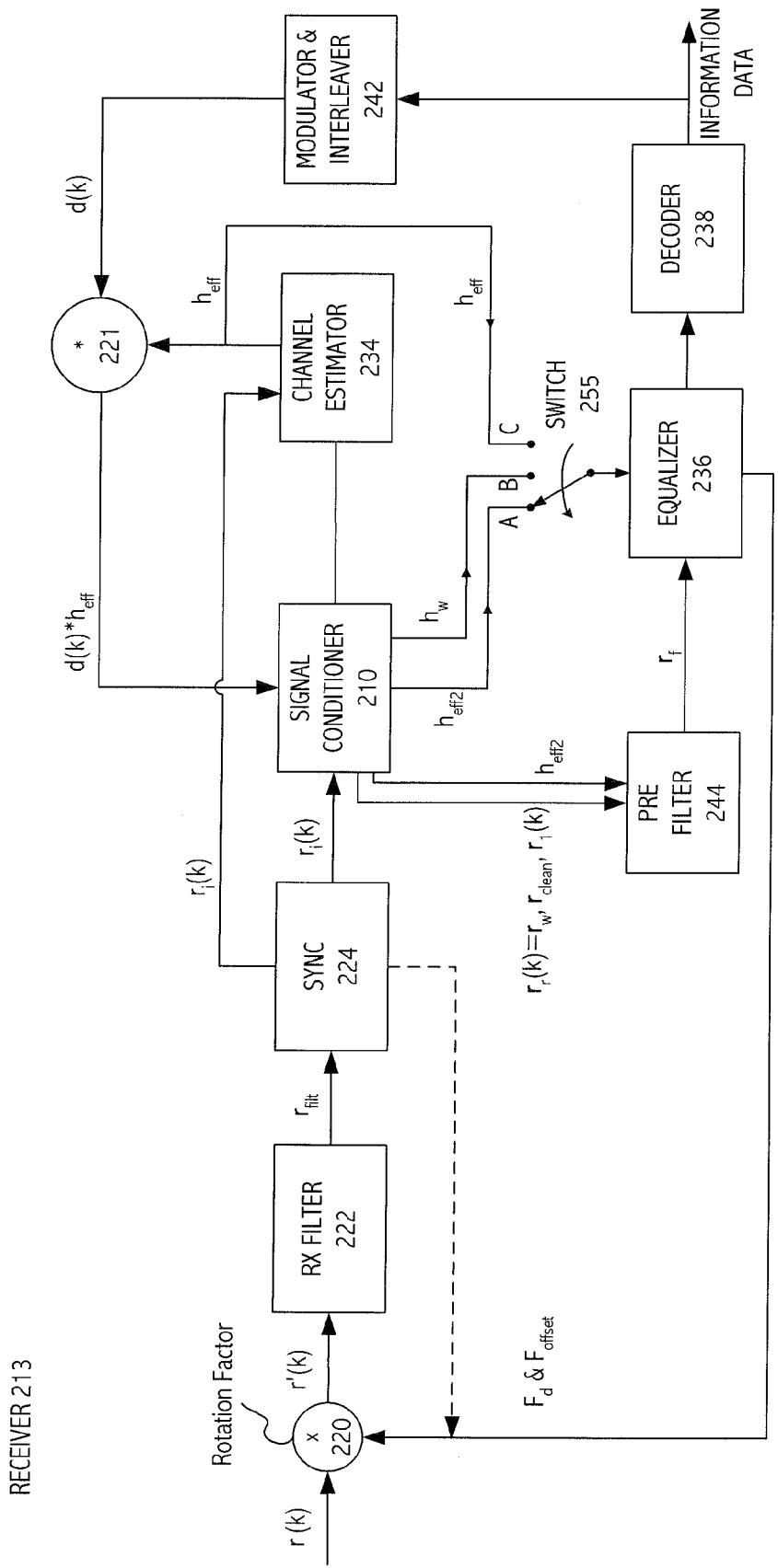
FIG. 3 is a block diagram of the receiver illustrated in FIG. 1 constructed in accordance with the teachings of the present invention.

FIG. 3 illustrates an exemplary embodiment of the receiver 213 according to one embodiment of the present invention. The receiver 213 includes a mixer 220, a receive (RX) filter 222, a synchronization logic module 224, a channel estimator 234, a modulator & interleaver circuit (M/I) 242, a pre-filter 244, an equalizer 236, selection switch 255, a decoder 238 and a signal conditioner 210.

The receiver 213 uses initial channel estimation and revised channel estimation techniques to reproduce and recreate a received signal r(k) originally transmitted from a transmitting source (i.e., transceiver 201, shown in FIG. 1). The method used to calculate the initial and revised channel estimate employs an interference cancellation algorithm that uses feedback from previous calculations of interference factors. Accordingly, as more iterations of the interference cancellation algorithm are made in the receiver 213, the better and more precise each interference calculation becomes. However, as will be appreciated by those skilled in the art, such feedback loops are subject to various receive conditions as the mobile device 203 travels and encounters various physical terrains, which affect the structure of the received signal r(k). A more detailed explanation of the methods used in the receiver 213 is described in the following paragraphs.

Assuming there is negligible feedback in a first frame of the received signal r(k) through the receiver 213, the received signal r(k) is passed virtually unmodified to the RX filter 222, in part because of a lack of a good estimate of the Doppler frequency ($F_d$). During this first frame, the output r'(k) of the mixer 220 and the input to the RX filter 222 is virtually identical to the received signal r(k) with the exception of a frequency rotation that offsets the Doppler frequency of the mobile and any frequency offset between the BTS and handset. The offsets $F_d$ and $F_{offset}$ are applied to the received signal r(k) to synchronize the receiver 213 with the transmission bursts from the transceiver 201. The RX filter 222 is preferably a matched filter that matches the transmitter filter and channel condition that passes the desired frequency band of the received signal r(k) and removes any aliases and other spurious signal components from the received signal r(k).

Matching the channel condition is accomplished as the received signal r(k) is passed through the RX filter 222. The filtered received signal ($r_{filt}$) is output from the RX filter 222 and then passed to the synchronization logic 224. The synchronization logic 224 selects the preferred sampling point of the filtered received signal ($r_{filt}$). Accordingly, based of the determined sampling point of the filtered received signal ($r_{filt}$), the synchronization logic 224 may decimate the filtered received signal ($r_{filt}$) to a lower sampling rate. If the subsequent components of the receiver 213 do not require processing at a higher sampling rate, then the sampling rate of the filtered received signal ($r_{filt}$) will be the same as the symbol rate. Because the training sequence of the desired signal d(k) and its relative position within the received signal r(k) are known, it is possible to estimate the channel response of the filtered received signal $r_{filt}$. There are various techniques known in the art that can be used to determine the start of the training sequence without departing from the scope of this invention. For example, the training sequence code and relative positions may be determined by calculating the position of the training sequence code that gives the highest correlation as the synchronized signal $r_i(k)$ is correlated with the desired signal d(k). The desired signal d(k) represents a hypothesized value of the transmitting signal.

In operation, when the synchronization logic 224 identifies the position of the training sequence code in the filtered received signal ($r_{filt}$), the synchronization logic 224 selects the preferred sampling offset point, among a set of offsets, that best maximizes the correlation of the filtered received signal ($r_{filt}$) with the known training sequence, while minimizing the mean square error. This synchronization compensates for the frequency and/or phase shifting caused by limited channel effects, time delays, or multipath fading, i.e., the variable patterns that are caused by reflections of the received signal r(k) from objects such as cliffs and buildings. As such, a noise plus interference factor (C/I+N) is introduced into the received signal r(k).

A wireless receiver typically estimates the interference and compensates for channel distortion adaptively, i.e., the initial channel estimate $h_{eff}$ is revised as each frame of the synchronized signal $r_i(k)$ is received by the channel estimator 234. The initial channel estimate $h_{eff}$ characterizes the noise plus interference variance estimator (C/I+N) introduced into the received signal r(k) by the path taken by the received signal r(k), as described above. The C/I+N ratio of the synchronized signal $r_i(k)$ is calculated by the channel estimator 234 and fed, along with the initial channel estimate $h_{eff}$, as inputs into the signal conditioner 210 to provide parameters for calculating control functions used in the signal conditioner 210.

The initial channel estimate $h_{eff}$ indicates, among other things, the received signal r(k) relative to the noise level known as the signal to noise ratio, or C/I, and the level of the multipath fading profile present in the synchronized signal $r_i(k)$. One of ordinary skill in the art will recognize that multipath fading is a form of radio fading caused by the existence of two or more paths between a transmitter and receiver. Delays on the reflected path may add to (strengthen) or subtract from (fade) the strength of the received signal r(k). It should be appreciated that the levels of acceptable multipath fading may vary and may be geographic dependent. Additionally, receivers typically compensate for the delay and strength profile based on standards in compliance with specific receiver performance parameters.

As mentioned above, the desired signal d(k) represents a second received signal hypothesized from the received signal r(k). The desired signal d(k) as shown in FIG. 3. is obtained from the decoder 238 by reconstructing a version of the received signal r(k). As mentioned earlier, the convolved signal d(k)*$h_{eff}$ is estimated based on the synchronized signal $r_i(k)$. The desired signal d(k) accounts for the memory (time delays) effect of amplitude variations of the channel.

In essence, the signal conditioner 210 applies multi-receiver signal interference cancellation to a SAIC receiver. The signal conditioner 210 uses the input variables (C/I+N) and the initial channel estimate $h_{eff}$ as threshold quantities to apply appropriate filtering to the synchronized signal $r_i(k)$ and the convolved signal d(k)*$h_{eff}$ to produce a revised signal $r_r(k)$. The revised signal $r_r(k)$ is representative of an approximation of the received signal r(k) as a function of the synchronized signal $r_i(k)$ and the convolved signal d(k)*$h_{eff}$. The revised signal $r_r(k)$ is output to the prefilter 244.

The prefilter 244 is preferably a minimum-phase filter. Due to the spread characteristics of the received signal r(k) resultant from C/I+N introduced into the signal, the revised signal $r_r(k)$ is preferably compacted prior to equalization by the equalizer 236. The prefilter 244 outputs a filtered $r_f(k)$, signal wherein the energy of the spectral components of the revised signal $r_r(k)$ have been compacted to fall within the symbol rate of the equalizer 236, such that the relevant components of the revised signal $r_r(k)$ may be used. This approach may also act to reduce the complexity of the equalizer 236.

The prefilter 244 demodulates the received signal using the revised channel estimate $h_{eff2}$ and the separated signal $r_{clean}$, or alternatively, the filtered separated signal $r_{fclean}$ as the case may be, to enhance the received signal based on the revised channel estimate $h_{eff2}$ or the weighted channel estimate $h_w$. Thus, the resulting signal output to the equalizer 236 has had its associated interferers canceled and represents a high quality reproduction of the original transmitted signal from the transceiver 201.

The equalizer 236 is generally known in the art and may be characterized as a MLSE (Most Likelihood Sequence Estimator). The equalizer 236 preferably uses a Viterbi algorithm to manipulate the filtered signal $r_f(k)$ and the channel estimate output from the switch 255.

A MLSE calculation is then applied to the signal. The MLSE locally generates all possible representations of the filtered signal $r_f(k)$ based on all of the possible transmitted sequences, and then compares these estimates to the filtered signal $r_f(k)$ that is actually received. As will be appreciated by those skilled in the art, the locally generated signal that most closely matches the received signal indicates what is the most likely transmitted sequence.

The output of the equalizer 236 includes softvalues of the filtered signal $r_f(k)$. The MLSE is an optimal detector in the sense of minimizing the accumulated detected errors for the transmitted sequence. The softvalues are fed to the decoder 238 to provide a series of decoded bits/symbols.

Due to the complexity of EDGE, it is preferable that a full Viterbi calculation not be performed in the equalizer 236. Rather a more appropriate, albeit sub-optimal algorithm, is preferably employed, such as RSSE (Reduced State Sequence Estimator) or DFSE (Decision Feedback Sequence Estimator) which, in the inventor's view, generally provides an acceptable trade-off between accuracy and complexity. The softvalues fed to the decoder 238 are generated based a Viterbi algorithm calculating the states of the filtered signal $r_f(k)$.

Additionally, from the equalizer 236, the estimated Doppler and offset frequency ($F_d$ & $F_{offset}$) of the non-dominant interferers are fed back to the mixer 220. The process used to find the estimated Doppler and offset frequencies is common and well known in the art. The Doppler and offset frequencies represent the apparent change in the received frequency due to the relative motion and rotation of the transceiver 201 and by providing and mixing such feedback with the received signal r(k), enhancing the second and subsequent calculations of the receiver 213. The frequency offset may also be estimated during the channel estimation phase in channel estimator 234 such that the overall minimum mean square and the channel estimate are jointly minimized. The decoder 238 produces a probability estimation of the softvalues output from the equalizer 236 to scale the output-softvalues to a more accurate (±1V) line=decoded representation. Finally, the decoder 238 scales the line-decoded representation to a binary representation of the signal to produce the final decoded bits/symbols. These decoded bit/symbols are sent as information data to the handset to be output to the user. The decoded bit/symbols of the decoder 238 are also input into the M/I 242.

The M/I 242, as known in the art, uses a data mixing technique to reduce the number of undetected error bursts. In the interleaving process, the decoded bit/symbols are reordered in such a manner that any two successive symbols are separated by n−1 symbols in the sequence, wherein n is the degree of interleaving to produce the desired signal d(k). The desired signal d(k) is finally ordered into its original sequence by the signal conditioner 210, after being convolved with the channel estimate $h_{eff}$, as discussed above. Thus, the errors (in time) are effectively spread or randomized to enable a more complete correction by a random error-correcting code used in the signal conditioner 210.

In all subsequent frames of data passed through the receiver 213, the resulting output of the decoder 238 becomes stronger and more accurate due to the iterative nature of the receiver 213 and the feedback loops present.

It should be understood that the receiver 213 of FIG. 3 and FIG. 4 may be, in general, implemented using a variety of hardware and/or software components. For example, the signal separator 228 may use a number of different commonly known communications components, such as demodulators, mixers, filters, and analog-to-digital (A/D) converters. In general, such components may be implemented using hardware such as discrete circuit components, hybrid circuits and application-specific integrated circuits (ASICs), and/or combinations of such hardware and software or firmware configured to execute on special-purpose processing devices or general-purpose processing devices such as microprocessors, microcontrollers and digital signal processor (DSP) chips. The equalizer 236 may similarly be implemented using special-purpose hardware such as gate arrays or ASICs, software or firmware executing on special purpose processing devices or on general purpose processing devices such as microprocessors, microcontrollers or DSP chips, or combinations thereof.

As shown in FIG. 4, one embodiment of the signal conditioner 210 preferably contains switches 240, 250 and 255, signal separator 228, a controller 230, a spatial and temporal whitening filter (S/T) 232 and a revised channel estimator 235.

In operation, the controller 230 manages the positions of switches 240, 250 and 255. The controller 230 provides control functions to the switches 240, 250 and 255 based on the C/I ratios contained in the input channel estimates $h_{eff}$ and $h_{eff2}$. The possible switch settings and signal treatment based on the C/I ratios are discussed below:

Low C/I Ratio

When low C/I ratios are detected in the synchronized signal $s_i(k)$, a signal separation may be advantageously performed. Thus, based on threshold parameters of the calculated C/I ratios from the channel estimator 234, the controller 230 will position the switch 250 in the "A" position, and the switch 240 will also be placed in the "A" position. While the switch 240 is in the "A" position, the synchronized signal $r_i(k)$ is passed to the signal separator 228.

With respect to determining the position of switch 240, the control 230 compares the initial C/I ratio from the initial channel estimator 234 with a weighted C/I ratio from the S/T filter 232. The weighted C/I ratio is a second estimate of the channel response of the cleaned signal $r_{clean}$.

The signal separator 228 performs a separation function using the separation algorithms previously discussed. The separation algorithm, using the convoluted signal d(k)*heff as one input and the synchronized signal $r_i(k)$ as a second input, outputs the separated signal $r_{clean}$ with the C/I+N removed or significantly diminished. The separated signal $r_{clean}$ represents a processed clean version of the desired signal d(k), wherein all C/I+N interferers of interest have been removed as determined by the receiver and based on the received signal r(k) and the other parameters set forth above. A more precise explanation of this switching process and the results achieved is described with respect to FIGS. 5 and 6.

From the signal separator 228, all separated interferers $I_s$ are fed to the S/T filter 232 separately, such that a weighted channel estimate $h_w$ of the initial channel estimate $h_{eff}$ may be calculated. The weighted channel estimate $h_w$ is fed into the prefilter 244. As will be appreciated by those skilled in the art, because of the iterative nature of the algorithms running on the receiver, the weighted channel estimate $h_w$, similar to the revised channel estimate represents a more precise version of the initial channel estimate $h_{eff}$.

Those skilled in the art will recognize that the S/T filter 232 may be any known or conventional filtering of the spatial and temporal whitening component as is commonly present in wireless transmissions, however an exemplary embodiment discussed later, an exemplary filter is discussed.

High C/I Ratio

If the interference contribution is considered negligible or non-existent (i.e., high C/I ratio), a signal separation does not need to be performed. In other words, when the values of the C/I ratios are high and exceed a predetermined threshold, the signal separator 228 and the S/T filter 232 are bypassed. In such a case, the switch 240 will be in position B. In this case, signal quality of the synchronized signal $r_i(k)$ and the convolved signal d(k)*$h_{eff}$ is considered good. While the switch 240 is in position B, the synchronized signal $r_i(k)$ is passed unchanged through the switch 240 to the prefilter 244. Accordingly, the switch 250 also is in position "B".

In this high C/I ratio case, a revised channel estimate $h_{eff}$ is calculated. The synchronized signal $r_i(k)$ is processed in a similar manner to the separated signal $r_{clean}$, as discussed above.

The switch 255 is controlled by controller 230 according to the positions of switches 240 and 250. For example, at a high C/I ratio, the switch 255 is set to position "B" to input the weighted channel estimate $h_w$ into the equalizer 236.

Figure 5:
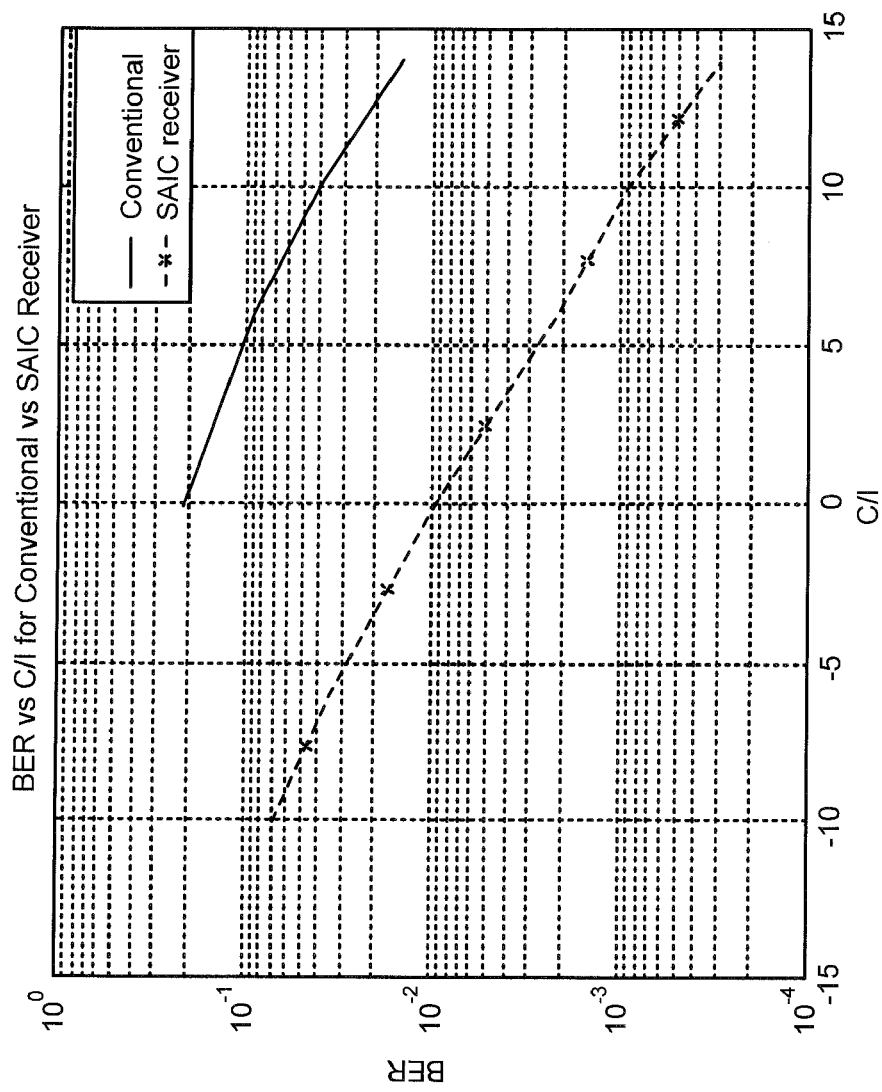
FIGS. 5 and 6 are graphs showing results obtained from numerical modeling of the techniques developed as part of the present invention.
Figure 6:
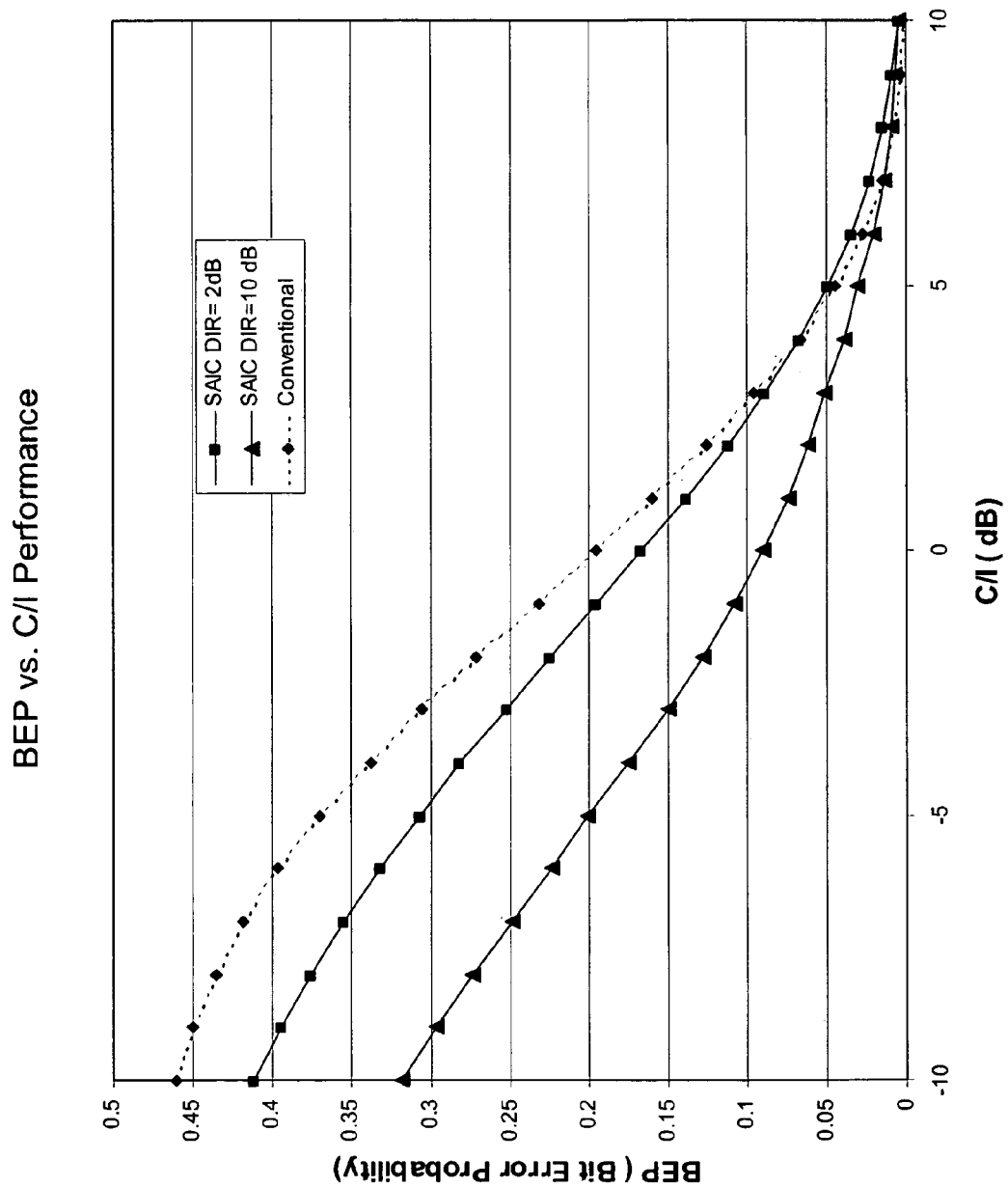

FIGS. 5 and 6 represent exemplary performance results from the receiver 213 based on algorithm modeling. These results are favorable and in view of the current teachings in the art, are also quite unexpected. In FIGS. 5 and 6 the performance curves relate a C/I ratio to a Raw BER percentage from use of the receiver 213 and are compared to those obtained using a conventional receiver for GMSK modulation using the same interference profile. It is clear from FIGS. 5 and 6 that the receiver 213 exhibits a robust performance increase over conventional receivers for low and high C/I ratios for a single interference scenario, as the case in FIG. 5, and across a wide range of DIR, as the case in FIG. 6. For ease of illustration in FIGS. 5 and 6, the performance curves of receiver 213 are labeled as "SAIC receiver". In FIGS. 5 and 6, it is seen that the relative link level SAIC gain difference between the conventional receiver and the receiver 213 is sizeable and unexpected.

FIG. 5 represents exemplary results output from the receiver 213 for single interferer rejection. At C/I ranges from −10 dB to +14 dB, the receiver 213 is sizably more effective in reducing the amount of BER present in the representative signal. In some instances, the receiver 213 exhibits more than one order of magnitude improvement in BER effectiveness.

In FIG. 6, performance is shown as a function of C/I for a conventional receiver, and as a function of C/I and DIR for the SAIC receivers. This model consists of mirrors the interference profile designated in 3GPP [See 3GPP Tdoc GAHS-030025, "Exemplary Link Level Assumption, Configurations ⅔", SAIC Rapporteur]; wherein five interferers are is used to characterize the link level performance of the receiver 213.

The interferers and other key assumptions are defined as follows:

Two Co-Channel Interferers;

One residual co-channel noise, which is based on multiple co-channels;

One adjacent channel interferer;

One residual adjacent noise, which is based on multiple adjacent channels; and

White Gaussian Noise.

It was determined that the average individual ratios of the dominant co-channel interferers to each of the other interferers was relatively constant over the range of C/I expected, and thus, the profiles are defined in terms of these ratios.

As shown in FIG. 6, as the value of the C/I ratio increases from −10 dB to +10 dB, the performance curves of the conventional receiver begin to converge with the performance curves of the receiver 213. Based on studies to date, the performance of the conventional receiver approaches that of the receiver 213. For example, in DIR=2 dB case, at C/I ratios higher than approximately 3 dB, and in the 10 dB case, at C/I ratios higher than 7 dB, the conventional receiver's performance may surpass that of the receiver 213. Accordingly, at such values, it may be advantageous to bypass the SAIC functions to achieve better performance and increase processing efficiencies. For this reason, in a preferred embodiment of the receiver 213, switch 240 was included, which when placed in position B, the signal separator 228 is bypassed.

Figure 7:
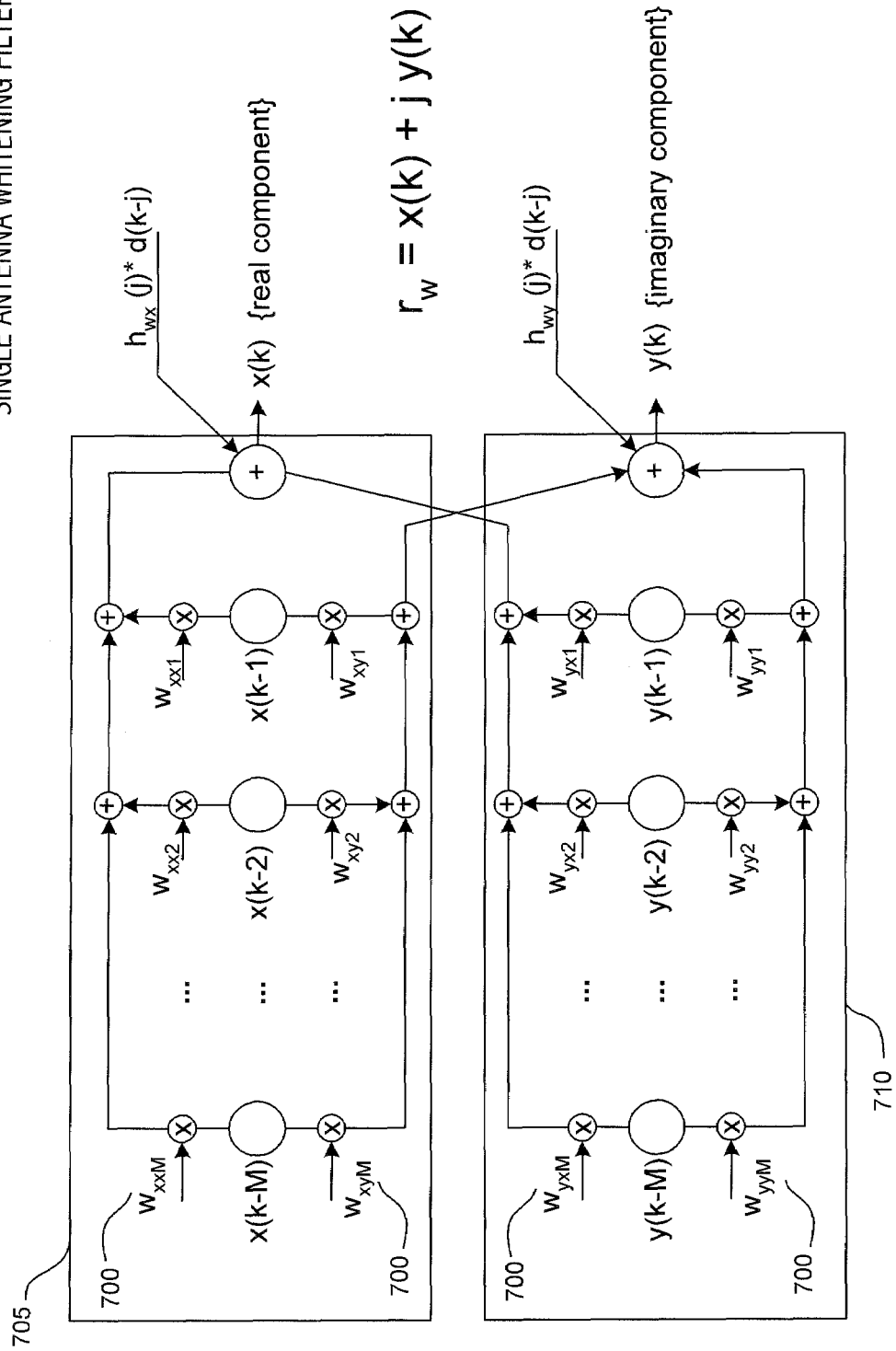
FIG. 7 is a diagram of the signal-whitening filter of the signal conditioner functional component illustrated in FIG. 4.

An exemplary S/T filter, according to the invention disclosed herein and as discussed above, is shown in FIG. 7. The S/T filter shown in FIG. 7 can be characterized as an adaptive filter. The aim of the adaptive (S/T filter) filter is to iteratively adapt the filter coefficients 700 such that the error sequence of the power of the covariance in the interference and noise is as close to zero as possible, within some value of tolerance. The S/T filter shown in FIG. 7 uses previous measurements of the real $(x(k-M) \ldots x(k-2) \ldots,$ etc.) and imaginary $(y(k-M) \ldots y(k-2) \ldots,$ etc.) symbols to predict the values of the current symbols of the real $(x(k))$ and imaginary $(y(k))$ components of the weighted signal $r_w$. Due to the relationship between the real and imaginary components $(x(k)$ and $y(k))$ present in the weighted signal $r_w$, the real function 705 and the imaginary function 710 are crossed-coupled, such that the previous values of the real components impact the values of the imaginary components and the previous values of the imaginary components impact the real components.

In design, the S/T filter must have an order (M) that is large enough to accurately predict the correlation between adjacent real and imaginary symbols. As the order (M) of the filter is successively increased, the correlation between adjacent real and imaginary symbols is reduced until the S/T filter produces a sequence of uncorrelated real and imaginary components $(x(k)$ and $y(k))$. Accordingly, the whitening of the input signal is accomplished to produce the weighted signal $r_w$.

Figure 8:
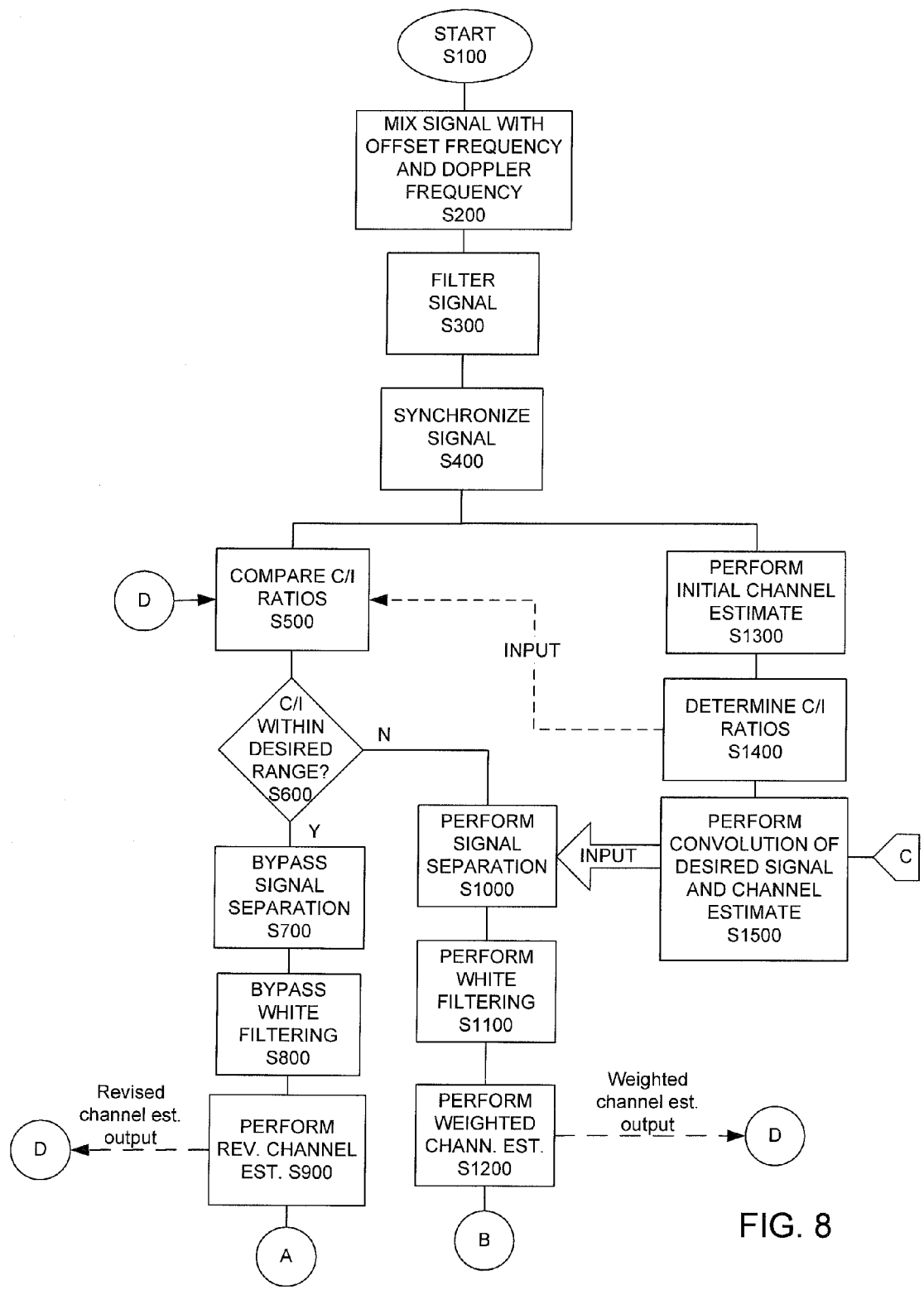
FIG. 8 is a flow diagram illustrating operationally the receiver in a preferred single antenna environment.
Figure 9:
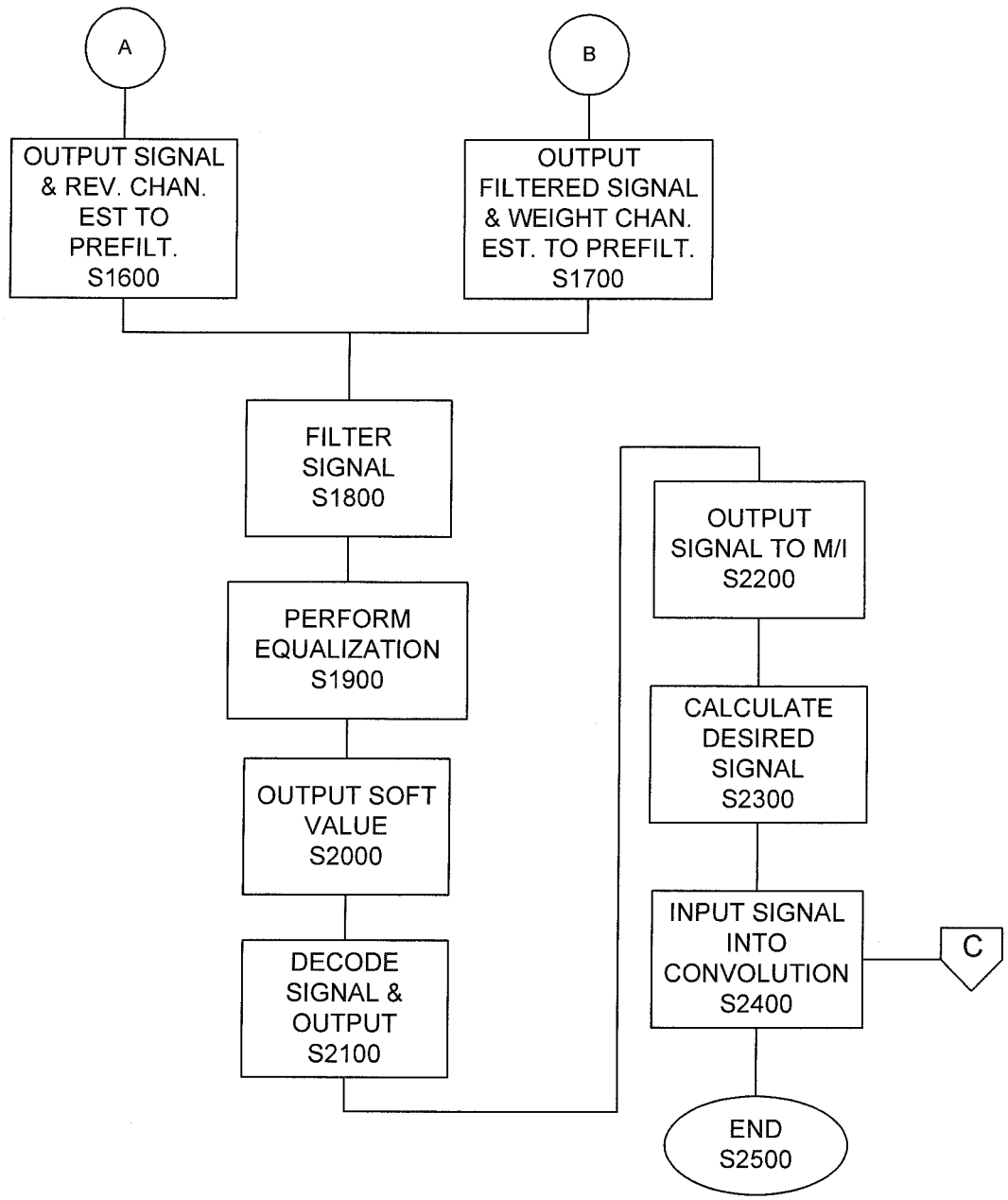
FIG. 9 is a flow diagram illustrating the post-processing functionality of the receiver in a preferred single antenna environment.

FIGS. 8 and 9 illustrate an exemplary method for interference canceling, according to this invention. The method begins at step S100 and proceeds to step S200 wherein a transmitted signal is received from a transceiver and mixed with a previously measured Doppler and Offset frequency. The Doppler and Offset frequencies represent the apparent change in the received frequency due to the relative motion of the transceiver. The process then continues to step S300.

At step S300, the received signal is filtered using a matching filter to correct the appropriate frequency band of the received signal. The filter also removes any unnecessary signal components from the received signal due to co-channel interference, bleeding, phase shifts, wideband interference, etc. Upon completion of the filtering, the filter outputs a filtered received signal to a synchronizer. The process then continues to step S400.

At step S400, the synchronizer determines the training sequence of an interferer and its relative position within the filtered received signal. The training sequence and its relative position are determined by the position that gives the highest correlation as the corrected signal is compared to a desired signal. Once the position of the training sequence is known, the synchronizer applies the appropriate offset frequencies to the signal to produce a synchronized signal. The process then proceeds to steps S500 and S1300 simultaneously.

At step S1300, an initial channel estimate is performed on the synchronized signal. The process then proceeds to step S1400, where the C/I ratio of the initial channel estimate is calculated. Once the C/I ratio is calculated it is input into a controller (S500). The process then continues to step S1500.

At step S1500, a convolution of the desired signal and the initial channel estimate is calculated. The convolved signal is input into a signal separator for use in producing a separated signal in step S1000.

In step S500, the C/I ratios from the initial channel estimate, the weighted channel estimate and the revised channel response are compared, as necessary, to determine whether they are within a predetermined threshold at step S600. If the ratios are within the predetermined threshold, the process continues to step S700. Otherwise, the process jumps to step S1000.

At steps S700 and S800, the signal separation and white filtering processes are bypassed in favor of conventional separation methods. The process then continues to step S900.

At step S900, a revised channel estimate is calculated. The revised channel estimate is fed back to the controller for comparison with the initial channel estimate or the weighted channel estimate, as necessary. The process continues to step S1600, as illustrated in FIG. 9.

Finally, at step S1600 the signal, whether it is a separated signal or the synchronized signal (due to the position of switch 250) and the revised channel estimate are passed to the prefilter at step S1800.

At step S1000, a signal separation is performed based on the input from the convolution of the desired signal and the initial channel response (S1500). The process then continues to step S1100.

At step S100, white and spatial filtering is performed on the separated signal to output a weighted signal. At step S1200, a weighted channel estimate is performed on the weighted signal. The process then continues to step S1700.

At step S1700, the weighted signal and the weighted channel estimate are output to a prefilter at step S1800.

At step S1800, the prefilter compacts the weighted or revised signal, as the case may be (for example, depending on the position of switch 250 of FIG. 4), to remove the effects of the spread characteristics resultant from C/I introduced into the signal. The process then continues to step S1900.

At step S1900, where an MLSE step is performed using Viterbi calculations and a branch metric is performed to trace back the original states of the received signal. From this trace back step, at step S2000, softvalues are output to a decoder.

Additionally, at step S1900 the estimated Doppler and Offset frequencies of the non-dominant interferers are fed back to a mixer to be used in step S2000. The process then continues to step S2100.

At step S2100 the softvalues are decoded to produce the detected bits/symbols. The process then continues to step S2200, where the detected bits/symbols are output to a modulator and interleaver. The process then continues to steps S2300 and S2400, wherein the desired signal is calculated from the detected bits/symbols and is output to a convolution function (step S1500) where a convolution of the desired signal and the initial channel estimate is performed.

The process finally ends at step S2500.

Although the process outlined in FIGS. 8 and 9 are described with a specific order of operation, one of ordinary skill will recognize that the order of many of the processes can be rearranged without departing from the scope of the invention. For example, with respect to FIG. 8, the process automatically bypasses the white and spatial filtering of the synchronized signal as a result of the separation step being bypassed. However, is should be recognized that the white and spatial filtering may be performed should the synchronized signal contain spatial or white noise.

The invention as embodied herein has been applied to the voice channel as an example. Those skilled in the art will recognize that the techniques and processes of the present invention may be used in other parts of a cellular system and applied to other types of wireless devices. For example, other modes of operation may include: 1) manipulating the interference cancellation for all logical channels traffic channels (TCH) and associate control channels (ACCH) of a wireless network; 2) employing the embodiments disclosed herein (interference cancellation) for the ACCH channel and not the traffic channel. (This is typically the case when operating in robust lower codec mode (4.75 and 5.9 codec) and the signaling is not as robust.); and 3) employ the embodiments disclosed herein (interference cancellation) for TCH and not ACCH. (This is typically the case when operating in less robust mode such as 12.2 and the signaling is relatively robust.)

Other embodiments of the invention will be apparent to those skilled in the art from consideration of the specification and practice of the invention disclosed herein. It is intended that the specification and examples be considered ad exemplary only, with a true scope and spirit of the invention being indicated by the following claims.

The invention claimed is:

1. A method for suppressing interference received by an antenna, comprising:
   receiving a first received signal at the antenna;
   hypothesizing a second received signal;
   separating an interfering signal from a desired signal using the first received signal and the hypothesized second received signal; and
   filtering the desired signal;
   wherein the filtering step comprises filtering through a multi-stage adaptive predictive filter having a real component and an imaginary component, and wherein an output of the imaginary component also serves as an input into a subsequent stage of the real component and wherein an output of the real component also serves as an input into a subsequent stage of the imaginary component.

2. The method of claim 1, wherein the second received signal is hypothesized using a training sequence code.

3. The method of clam 2, further comprising:
   estimating a channel response based on the first received signal; and
   wherein the training sequence code has an expected value and the first signal has an observed training sequence code associated therewith and the estimating step is based on the expected value of the training sequence code and the observed training sequence code.

4. The method of claim 3, wherein the estimating step comprises a convolution of a transmitted filter response, received filter response, and a media response in accordance with the following equation:

$$h_{\mathit{eff}}(n) = tx(n) * C(n) * rx(n),$$

wherein tx(n) is the transmitter filter response, rx(n) is the receiver filter response, C(n) is the media response, and wherein $h_{\mathit{eff}}(n)$ is a channel impulse response.

5. The method of claim 1, wherein the separating step comprises an application of the central limit theorem.

6. The method of claim 5, wherein the central limit theorem is implemented in accordance with the following:
   a next value of $$s_p(m+1) = s_p(m+1) - \sum_{j=1}^{P} s_j s_j^H s_p(m+1),$$

where $s_p(m+1)$ is an estimated vector, m, j, and p are integers, $s_j$ are previously found orthogonal vectors, and $s_j^H$ is the conjugate transposeof $s_j$.

7. The method of claim 1, wherein the separating step is selectively performed according to a carrier to interference (C/I) ratio being below a predetermined level.

8. The method of claim 7, further comprising selectively filtering the desired signal.

9. The method of claim 8, wherein the separating step is selectively performed as a function of the C/I ratio as applied to an initial channel estimate and a weighted C/I ratio as determined in the filtering step.

10. The method of claim 8, wherein the filtering step and the separating step are performed when C/I ratios fall below the predetermined level.

11. The method of claim 1, wherein the hypothesized second received signal is hypothesized using an expected value of the first received signal.

12. The method of clam 11, wherein the first signal has an observed value associated therewith and the estimating step is based on the expected value and the observed value.

13. A method for suppressing interference received by an antenna, comprising:
- receiving a first received signal at the antenna;
- hypothesizing a second received signal;
- separating an interfering signal from a desired signal using the first received signal and the hypothesized second received signal;
- selectively filtering the desired signal; and
- wherein the filtering step comprises filtering through a multi-stage adaptive predictive filter having a real component and an imaginary component, and wherein an output of the imaginary component also serves as an input into a subsequent stage of the real component and wherein an output of the real component also serves as an input into a subsequent stage of the imaginary component.

14. The method of claim 13, wherein the filtering step is selected based on a carrier to interference (C/I) ratio.

15. The method of claim 14, wherein the filtering step is selected when the C/I ratio falls below a predetermined threshold.

16. The method of claim 13, wherein the filtering step is selected based on a low C/I ratio as applied to a synchronized signal.

17. A method comprising:
- receiving a transmitted signal at a receiver as a first received signal;
- hypothesizing another received signal based at least in part on a predefined transmit sequence associated with the first received signal;
- separating one or more interfering signals from the first received signal using the first received signal and the hypothesized other received signal; and
- selectively filtering the desired signal through a multi-stage adaptive predictive filter supplying a real component and an imaginary component, and wherein previous values of imaginary components serve as an input in determination of a current real component and wherein previous values of real components serve as an input in determination of a current imaginary component.

18. The method as recited in claim 17, wherein the predefined transmit sequence is associated with a training sequence code.

19. The method as recited in claim 17 wherein hypothesizing the other received signal comprises:
- convolving data d(k) with an estimated channel response ($h_{eff}$) to form d(k)*$h_{eff}$ as the hypothesized other received signal.

20. The method as recited in claim 19 wherein hypothesizing the other received signal further comprises:
- decoding data bits associated with the first received signal; and
- interleaving and modulating the decoded data bits to form the data d(k) corresponding to transmitted data.

* * * * *

UNITED STATES PATENT AND TRADEMARK OFFICE
CERTIFICATE OF CORRECTION

PATENT NO. : 7,496,164 B1  
APPLICATION NO. : 10/837933  
DATED : February 24, 2009  
INVENTOR(S) : Ayman A. Mostafa Page 1 of 1

It is certified that error appears in the above-identified patent and that said Letters Patent is hereby corrected as shown below:

Please delete the duplicate paragraph beginning at Col. 12, line 21 (The inventor prefers...) through Col. 13, line 18 (...coefficients in 'h'.)

Please insert the following paragraph at Col. 17, before line 48:

--The synchronization logic 224 then outputs the synchronized signal $r_i(k)$ to the channel estimate 234 and the signal conditioner 210. The initial channel estimate $h_{eff}$ of the synchronized signal $r_i(k)$ is calculated in the channel estimator 234. The initial channel estimate $h_{eff}$ is calculated to compensate for the variation experienced by the signal due to radial distances, terrain, multipath fading, scattering and other channel effects. Out of the channel estimator 234, the initial channel estimate $h_{eff}$ of the synchronized signal $r_i(k)$, is output and convolved with the desired signal $d(k)$. The initial channel estimate $h_{eff}$ is convolved with the desired signal $d(k)$ at the convolution point 221 to provide the convolved signal $d(k)* h_{eff}$. The convolved signal $d(k)* h_{eff}$ represents a known hypothesized, second received signal. This convolved signal $d(k)* h_{eff}$ is treated by the signal conditioner 210, as if it were received by a second antenna receiver, even though a second antenna receiver is non-existent. The convolved signal $d(k)* h_{eff}$ is an input into the signal conditioner 210 as shown in Fig. 3.--

Signed and Sealed this

Nineteenth Day of May, 2009

JOHN DOLL  
*Acting Director of the United States Patent and Trademark Office*